UNITED STATES PATENT OFFICE.

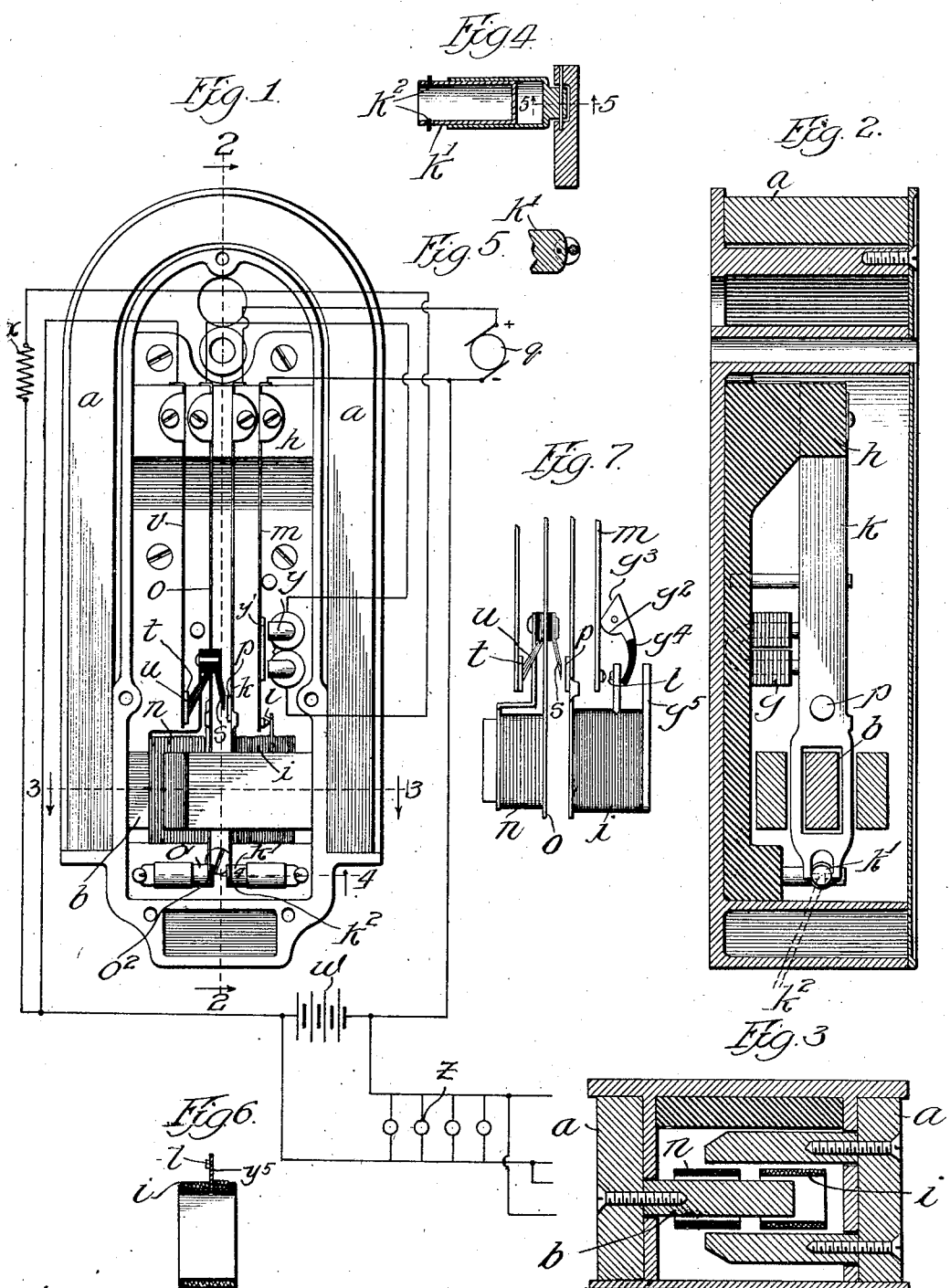

ALBERT E. BERDON, OF LA FAYETTE, INDIANA, ASSIGNOR TO ESTERLINE COMPANY, OF LA FAYETTE, INDIANA, A CORPORATION OF INDIANA.

ELECTRIC CONTROLLER.

1,065,657.  Specification of Letters Patent.  Patented June 24, 1913.

Application filed January 6, 1911. Serial No. 601,226.

*To all whom it may concern:*

Be it known that I, ALBERT E. BERDON, citizen of the United States, residing at La Fayette, in the county of Tippecanoe and State of Indiana, have invented a certain new and useful Improvement in Electric Controllers, of which the following is a full, clear, concise, and exact description, reference being had to the accompanying drawings, forming a part of this specification.

My invention relates to electric current controlling devices and is of particular service in connection with the charging of storage batteries from a source of current of varying electromotive force such as is common in car lighting systems, or in systems supplied by automobile driven generators, although I do not wish to be limited to these uses.

My invention in its various aspects will be explained in connection with the following description of the preferred embodiment thereof shown in the accompanying drawing in which—

Figure 1 is a front elevation of the device of my invention, together with certain external apparatus and circuit connections in association with which my device may be used, Fig. 2 is a side sectional elevation of my device, on line 2—2 of Fig. 1, Fig. 3 is a horizontal section on line 3—3 of Fig. 1, Fig. 4 is a fragmentary section on line 4—4 of Fig. 1, Fig. 5 is a fragmentary section on line 5—5 of Fig. 4, Fig. 6 is a detail sectional view of the high pressure coil, and Fig. 7 is a view of a modification.

Like parts are indicated by similar characters of reference throughout the different figures.

The device of my invention is shown in Fig. 1 in association with a charging generator and a storage battery to be charged thereby, although I do not wish to be limited to this use. The permanent horse shoe magnet $a$ has an insetting pole piece $b$, preferably separable from the main portion of the magnet. The high wound pressure coil or solenoid $i$ is rigidly attached to, and one of its terminals is electrically connected with, the free end of the conducting spring support $k$, the fixed end of which support is firmly held in place by the insulating support $h$. The second terminal of the pressure coil is electrically connected to the contact $l$ normally in contact with the free end of the conducting spring $m$, the fixed end of which spring is also firmly held in place by the insulating support $h$. Referring to Fig. 3, this pressure coil or solenoid surrounds and is mechanically free of the pole piece $b$ of the permanent magnet so that a magnetic field produced by a current in this pressure coil will coöperate with the magnetic field of the permanent magnet to cause said pressure coil to move longitudinally of said pole piece, said movement carrying the free end of the support $k$ with the pressure coil. The low wound series or current coil or solenoid $n$ is rigidly attached to, and one of its terminals is electrically connected with, the free end of the conducting spring support $o$, the fixed end of which support is firmly held in place by the insulating support or mounting. The spring supports for the current and pressure coils constitute supporting structures or mechanism allowing the coils to be moved when the coils are energized and which restore the coils to normal positions when deënergized. The second terminal of this current coil or solenoid $n$ is electrically connected to the contact $s$ which is insulated from the support $o$ except for the path through the current coil $n$, the brush $s$ being carried by the support $o$ as indicated in Fig. 7. Referring still to Fig. 3, the current coil $n$ surrounds and is mechanically free of the pole piece $b$ of the permanent magnet, so that a magnetic field produced by a current in this current coil will coöperate with the magnetic field of the permanent magnet to cause said current coil to move longitudinally of said pole piece, said movement carrying the free end of the support $o$ with the current coil, the fixed end of this support being firmly held in place by the insulating mounting. A path for current through the pressure coil $i$ may be traced from the positive terminal of the generator $q$ through the spring support $k$, the pressure coil $i$, the contact $l$, the conducting spring $m$, to the negative terminal of the generator $q$. The normal polarity of the generator and the direction of the winding of the pressure coil are such that the resulting magnetic field of said pressure coil and the magnetic field of the permanent magnet coöperate to move such pressure coil toward the current coil $n$, such movement finally causing the brush $s$ to be engaged by the contact $p$ to establish circuit through the current coil $n$, which circuit may be traced from the positive terminal of the generator $q$ through the support $k$, the contact $p$, the brush $s$, the current coil $n$, the support $o$, the brush $u$ which is electrically connected with and is carried by the support $o$ as indicated in Fig. 7, the contact $t$, the spring support $v$ for said contact, the storage battery $w$ or other translating device, to the negative terminal of the generator $q$. An adjusting resistance $x$, say of 1 ohm, provides a permanent path for current around the contact $t$ and brush $u$ for a purpose which will appear hereinafter. Assuming the generator $q$ to be started from rest and gradually brought to its normal speed, its electromotive force at the same time gradually increasing to its normal value, the pressure coil $i$ will move gradually to the left (referring to Fig. 1) until the brush $s$ makes contact with the contact $p$ to establish a charging circuit for the battery $w$ as above described, the operation of the elements $m$ and $k$ being such that said charging circuit cannot be established until the electromotive force of the generator is of a suitable minimum value. Thus, the device acts as an automatic circuit closing device under the control of the impressed electromotive force. The normal polarity of the generator and the direction of the winding in the current coil $n$ are such as to establish a magnetic field which will coöperate with the magnetic field of the permanent magnet to tend to move said current coil toward the pressure coil $i$, or to the right as shown in Fig. 1, and the windings of the pressure and current coils are so related that a charging current greater than some predetermined value will cause the tendency of the current coil to move to the right to overcome the tendency of the pressure coil to move to the left, thus permitting a sufficient excess of current to cause both coils to move to the right (Fig. 1) until circuit through the pressure coil is broken at the contact $l$. The opening of the pressure coil circuit at the contact $l$ removes the tendency of the pressure coil to retard movement toward the right of both the pressure and current coils, as a result of which the current coil acts to cause both coils to move a further small distance to the right, opening the circuit for the charging current at the contact $t$ and the brush $u$ and causing all of said charging current to pass through the parallel path including the adjusting resistance $x$. Circuit through the resistance $x$, when contact at $t$ is broken, may be traced from the positive pole of the generator $q$ through the spring support $k$, contact $p$ carried thereby, brush $s$, spring support $o$ carrying said brush and in electrical connection therewith by way of the coil $n$, the magnet $y$, the resistance $x$, the battery $w$ to the negative pole of said generator. The adjusting resistance $x$ serves to prevent a dangerously large current from passing through the battery $w$. As soon as the cause of the excessive current is removed, for instance by a reduction in generator electromotive force or by an increase in the resistance of the external load circuit, the supports $o$ and $k$, by reason of their resiliency, move the current coil back to the left again to close path for the charging current through the contact $t$ and the brush $u$, and to close path through the pressure coil through the contact $l$, the apparatus again assuming its normal charging condition. Thus, the device acts to prevent excessive overload on either the generator or its external load circuit and further acts to restore normal circuit relations as soon as the cause of the excessive overload has been removed. It is clear that a reduction in generator electromotive force below a predetermined value will reduce the tendency of the pressure coil $i$ to move to the left, a movement of said pressure coil to the right resulting as a consequence of the resiliency of the support $k$ and spring $m$, said movement opening circuit for the charging current at the brush $s$ and contact $p$. If, by accident or otherwise, the polarity of the electromotive force of the generator becomes reversed, then the direction of current in the pressure coil $i$ will be reversed and thereby cause such coil to move to the right, thus preventing the possibility of circuit being closed through the current coil $n$ and through the storage battery $w$. Thus, the device acts as a circuit breaker when the source of current fails, when its electromotive force falls below a predetermined value, or when its polarity becomes reversed from any cause, and it further acts to restore normal circuit relations as soon as the cause of its action as a circuit breaker has been removed. Load $z$ is shown connected to the storage battery $w$.

The apparatus thus far described is shown as being peculiarly adapted to circuits in which unidirectional currents flow, and when the apparatus is adapted to systems employing unidirectional currents, I employ a magnet of unchanging polarity and prefer to employ a permanent magnet in the environment which has been illustrated and described.

To prevent the apparatus which has been described above from being too sensitive, I cause circuit to open at $l$ before the normal series circuit is opened at $t$ and cause circuit closure at $l$ before the normal series circuit closure occurs at $t$. In order that these results may be accomplished, I provide means for automatically adjusting one or the other of the springs $m$ or $v$ when the circuit at $t$ is opened to enable occurrence of circuit closure at $l$ before circuit closure occurs at $t$. When circuit closure has occurred at $t$ the automatically adjusting means permits the spring it had previously adjusted to assume its natural position in order that circuit may be opened at $l$ before circuit is opened at $t$.

In the embodiment of the invention shown in Figs. 1 and 2, I have provided a magnet $y$ of negligible resistance but which is in series with the resistance $x$ and is shown as being permanently connected with the resistance and a pole of the battery. The armature $y^1$ of the magnet is shown upon the spring $m$ and the magnet therefore adjusts the position of the spring $m$ when circuit is opened at $t$ for the purpose stated. When circuit is closed at $t$ the magnet $y$ is deenergized, whereupon the spring $m$ is permitted to assume its natural position for the purpose stated. The magnet thus constitutes one form of automatically adjusting means last above generally referred to. Another form of automatically adjusting means is shown in Fig. 7 and resides in a mechanical device that includes a cam having a dwell $y^2$ concentric with the axis of movement of the cam and a flat face $y^3$ permitting the spring $m$ more closely to approach contact $l$ in order that circuit might be closed at $l$ before circuit is closed at $t$. The coil $i$ carries a finger $y^5$ and the cam carries an insulated arm $y^4$ extending between the finger $y^5$ and the rigid arm carrying contact $l$ to secure the proper operation of the cam, whereby it accomplishes the same adjustment as is accomplished by the magnet $y$.

As my invention finds an important use in automobile practice, I provide means for rendering the contacts $k$ and $o$ sluggish in their operation so that they will not be jarred by vibration. To this end I connect the springs with the plungers $k^1$ $o^1$ of dash pots and flexibly connect the barrels of the dash pots with a rigid part of the structure. I bifurcate the free ends of the springs $k$ $o$ and provide the bifurcated ends with insetting teeth $k^2$ $o^2$. By moving or bending the bifurcated spring ends out of the same planes the insetting teeth may readily be engaged with diametrically opposite recesses in the dash pot plungers. The plungers are desirably in the form of tubes having their inner ends closed to constitute the plunger pistons. The cylinders in which these pistons reciprocate are swingingly mounted as indicated in Figs. 4 and 5 so that the tubular plungers will not bind in the cylinders. The contact $l$ is mounted upon the coil $i$ in rigid relation thereto as indicated in Fig. 6, this contact having a base portion angular with respect thereto over which the winding of the coil $i$ passes to hold the contact in place. The pole piece of the permanent magnet which is surrounded by the movable coils is sandwiched between two other pole pieces extending from the opposite side of the permanent magnet for the purpose of affording a proper completion for the magnetic circuit, such construction appearing in Fig. 3. I do not wish to be limited to this construction however.

The embodiment of my invention herein specifically shown constitutes an improvement upon the structure set forth and claimed in my co-pending application Serial No. 570,239, filed July 5, 1910, and relating to "electric current controlling device."

While I have herein shown and particularly described the preferred embodiment of my invention, I do not wish to be limited to the precise details of construction shown, as changes may be readily made without departing from the spirit of the invention, but,

Having thus described my invention, I claim as new and desire to secure by Letters Patent the following:—

1. An electric current controlling device, and an electric circuit controlled thereby, said device including a magnet of unchanging polarity, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and means coöperating with said switching mechanism to cause circuit to be opened and closed through the pressure coil before circuit is opened and closed through the current coil.

2. An electric current controlling device, and an electric circuit controlled thereby, said device including a magnet of unchanging polarity, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and electromagnetic means coöperating with said switching mechanism to cause circuit to be opened and closed through the pressure coil before circuit is opened and closed through the current coil.

3. An electric current controlling device, and an electric circuit controlled thereby, said device including a magnet, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and means coöperating with said switching mechanism to cause circuit to be opened and closed through the pressure coil before circuit is opened and closed through the current coil.

4. An electric current controlling device, and an electric circuit controlled thereby, said device including a magnet, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and electro-magnetic means coöperating with said switching mechanism to cause circuit to be opened and closed through the pressure coil before circuit is opened and closed through the current coil.

5. An electric current controlling device, and an electric circuit controlled thereby, said device including a magnet, a pressure coil, a current coil, said coils being movable with relation to the magnet, switching mechanism for opening and closing circuit connections through the pressure and current coils, and means coöperating with said switching mechanism to cause circuit to be opened and closed through the pressure coil before circuit is opened and closed through the current coil.

6. An electric current controlling device, and an electric circuit controlled thereby, said device including a magnet, a pressure coil, a current coil, said coils being movable with relation to the magnet, switching mechanism for opening and closing circuit connections through the pressure and current coils, and electro-magnetic means coöperating with said switching mechanism to cause circuit to be opened and closed through the pressure coil before circuit is opened and closed through the current coil.

7. An electric current controlling device, and an electric circuit controlled thereby, said device including a magnet of unchanging polarity, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and means coöperating with said switching mechanism to cause circuit to be opened and closed through the pressure coil before circuit is opened and closed through the circuit coil, the pressure coil coöperating with the magnet to close said electric circuit at a predetermined minimum value of electromotive force impressed on said pressure coil, said current coil and magnet coöperating to open said electric current at a predetermined maximum value of current flowing in said current coils.

8. An electric current controlling device, and an electric circuit controlled thereby, said device including a magnet of unchanging polarity, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and electro-magnetic means coöperating with said switching mechanism to cause circuit to be opened and closed through the pressure coil before circuit is opened and closed through the current coil, the pressure coil coöperating with the magnet to close said electric circuit at a predetermined minimum value of electromotive force impressed on said pressure coil, said current coil and magnet coöperating to open said electric circuit at a predetermined maximum value of current flowing in said current coil.

9. An electric current controlling device, and an electric circuit controlled thereby, said device including a magnet, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and means coöperating with said switching mechanism to cause circuit to be opened and closed through the pressure coil before circuit is opened and closed through the current coil, the pressure coil coöperating with the magnet to close said electric circuit at a predetermined minimum value of electromotive force impressed on said pressure coil, said current coil and magnet coöperating to open said electric circuit at a predetermined maximum value of current flowing in said current coil.

10. An electric current controlling device, and an electric circuit controlled thereby, said device including a magnet, a movable pressure coil, a movable current coil, both of said coils being in coöperative relation with said magnet whereby the magnetic fields produced by said magnet and the current in said coils effect movement of said coils, means for restoring the coils to normal positions when deënergized, switching mechanism for opening and closing circuit connections through the pressure and current coils, and electro-magnetic means coöperating with said switching mechanism to cause circuit to be opened and closed through the pressure coil before circuit is opened and closed through the current coil, the pressure coil coöperating with the magnet to close said electric circuit at a predetermined minimum value of electromotive force impressed on said pressure coil, said current coil and magnet coöperating to open said electric circuit at a predetermined maximum value of current flowing in said current coil.

11. An electric current controlling device, and an electric circuit controlled thereby, said device including a magnet, a pressure coil, a current coil, said coils being movable with relation to the magnet, switching mechanism for opening and closing circuit connections through the pressure and current coils, and means coöperating with said switching mechanism to cause circuit to be opened and closed through the pressure coil before circuit is openend and closed through the current coil, the pressure coil coöperating with the magnet to close said electric circuit at a predetermined minimum value of electromotive force impressed on said pressure coil, said current coil and magnet coöperating to open said electric circuit at a predetermined maximum value of current flowing in said current coil.

12. An electric current controlling device, and an electric circuit controlled thereby, said device including a magnet, a pressure coil, a current coil, said coils being movable with relation to the magnet, switching mechanism for opening and closing circuit connections through the pressure and current coils, and electro-magnetic means coöperating with said switching mechanism to cause circuit to be opened and closed through the pressure coil before circuit is opened and closed through the current coil, the pressure coil coöperating with the magnet to close said electric circuit at a predetermined minimum value of electro-motive force impressed on said pressure coil, said current coil and magnet coöperating to open said electric circuit at a predetermined maximum value of current flowing in said current coil.

In witness whereof, I hereunto subscribe my name this 22rnd day of Dec. A. D., 1910.

ALBERT E. BERDON.

Witnesses:
   J. W. ESTERLINE,
   A. J. WEBER.